United States Patent
Sharma et al.

(10) Patent No.: US 11,815,592 B2
(45) Date of Patent: Nov. 14, 2023

(54) METHOD AND SYSTEM FOR MANAGING A CONTROL OPERATION OF AN UNMANNED AERIAL VEHICLE

(71) Applicant: SAMSUNG ELECTRONICS CO., LTD., Suwon-si (KR)

(72) Inventors: Neha Sharma, Karnataka (IN); Chitradeep Majumdar, Karnataka (IN); Aneesh Deshmukh, Karnataka (IN); Diwakar Sharma, Karnataka (IN); Anshuman Nigam, Karnataka (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/837,856

(22) Filed: Jun. 10, 2022

(65) Prior Publication Data
US 2022/0397663 A1    Dec. 15, 2022

Related U.S. Application Data

(63) Continuation of application No. PCT/KR2022/008052, filed on Jun. 8, 2022.

(30) Foreign Application Priority Data

Jun. 9, 2021   (IN) .............................. 202141025681
May 24, 2022   (IN) .............................. 202141025681

(51) Int. Cl.
*G01S 13/87*    (2006.01)
*B64C 39/02*    (2023.01)
(Continued)

(52) U.S. Cl.
CPC .......... *G01S 13/876* (2013.01); *B64C 39/024* (2013.01); *G06F 18/214* (2023.01); *B64U 2101/20* (2023.01); *B64U 2201/20* (2023.01)

(58) Field of Classification Search
CPC .............. B64C 39/024; B64U 2101/20; B64U 2201/20; G01S 13/876; G05D 1/104;
(Continued)

(56) References Cited

U.S. PATENT DOCUMENTS

| | | |
|---|---|---|
| 10,020,872 B2 | 7/2018 | Murphy |
| 11,221,634 B2 | 1/2022 | Hong |

(Continued)

FOREIGN PATENT DOCUMENTS

| | | |
|---|---|---|
| WO | 2018/071453 | 4/2018 |
| WO | 2020/207973 | 10/2020 |

OTHER PUBLICATIONS

Search Report and Written Opinion dated Sep. 6, 2022 issued in International Patent Application No. PCT/KR2022/008052.
(Continued)

*Primary Examiner* — Omer S Khan
(74) *Attorney, Agent, or Firm* — Nixon & Vanderhye, P.C.

(57) ABSTRACT

The present disclosure discloses a method for managing a UAV control operation that includes: periodically receiving a request for transmission of UAV assistance information from a network entity and establishing a radio resource control (RRC) connection with the network entity. In response to the received request, the method further includes determining a triggering of at least one event corresponding to an initiation of a UAV control operation and transmitting UAV assistance information to the network entity in an RRC connected state based on the determined triggering of the at least one event. The method further includes receiving a control message from the network entity in response to the transmitted UAV assistance information. The control message includes information related to an execution of the UAV control operation. Thereafter, the method further
(Continued)

includes executing the UAV control operation based on the information included in the received control message.

14 Claims, 10 Drawing Sheets

(51) Int. Cl.
*G06F 18/214* (2023.01)
*B64U 101/20* (2023.01)

(58) Field of Classification Search
CPC .. G06F 18/214; G08G 5/0013; G08G 5/0026; G08G 5/0052; G08G 5/0069
See application file for complete search history.

(56) References Cited

U.S. PATENT DOCUMENTS

| | | | |
|---|---|---|---|
| 11,601,861 | B2 | 3/2023 | Hong |
| 2018/0102831 | A1 | 4/2018 | Murphy |
| 2019/0379445 | A1 | 12/2019 | De Rosa et al. |
| 2020/0192348 | A1* | 6/2020 | Koziol .............. H04W 36/0033 |
| 2020/0266903 | A1* | 8/2020 | De Rosa ............ H04B 7/18506 |
| 2020/0288407 | A1* | 9/2020 | Kalhan ............... H04W 52/243 |
| 2021/0089055 | A1* | 3/2021 | Tran ..................... G08G 5/0082 |
| 2021/0125075 | A1* | 4/2021 | Lee ......................... G06N 3/084 |
| 2021/0343152 | A1* | 11/2021 | Faccin ................. G08G 5/0069 |
| 2022/0190888 | A1 | 6/2022 | Dai et al. |
| 2022/0287114 | A1* | 9/2022 | Liu ....................... H04L 1/1896 |

OTHER PUBLICATIONS

3GPP TR 22.829 V17.1.0, 3rd Generation Partnership Project; Technical Specification Group Services and System Aspects; Enhancement for Unmanned Aerial Vehicles; Stage 1 (Release 17), Sep. 2019, 47 pages.

3GPP TR 38.811 V15.4.0, 3rd Generation Partnership Project; Technical Specification Group Radio Access Network; Study on New Radio (NR) to support non-terrestrial networks (Release 15), Sep. 2020, 127 pages.

Office Action dated Sep. 25, 2023 in counterpart Indian Patent Application No. 202141025681 and English-language translation.

* cited by examiner

[RELATED ART]

(RELATED ART)

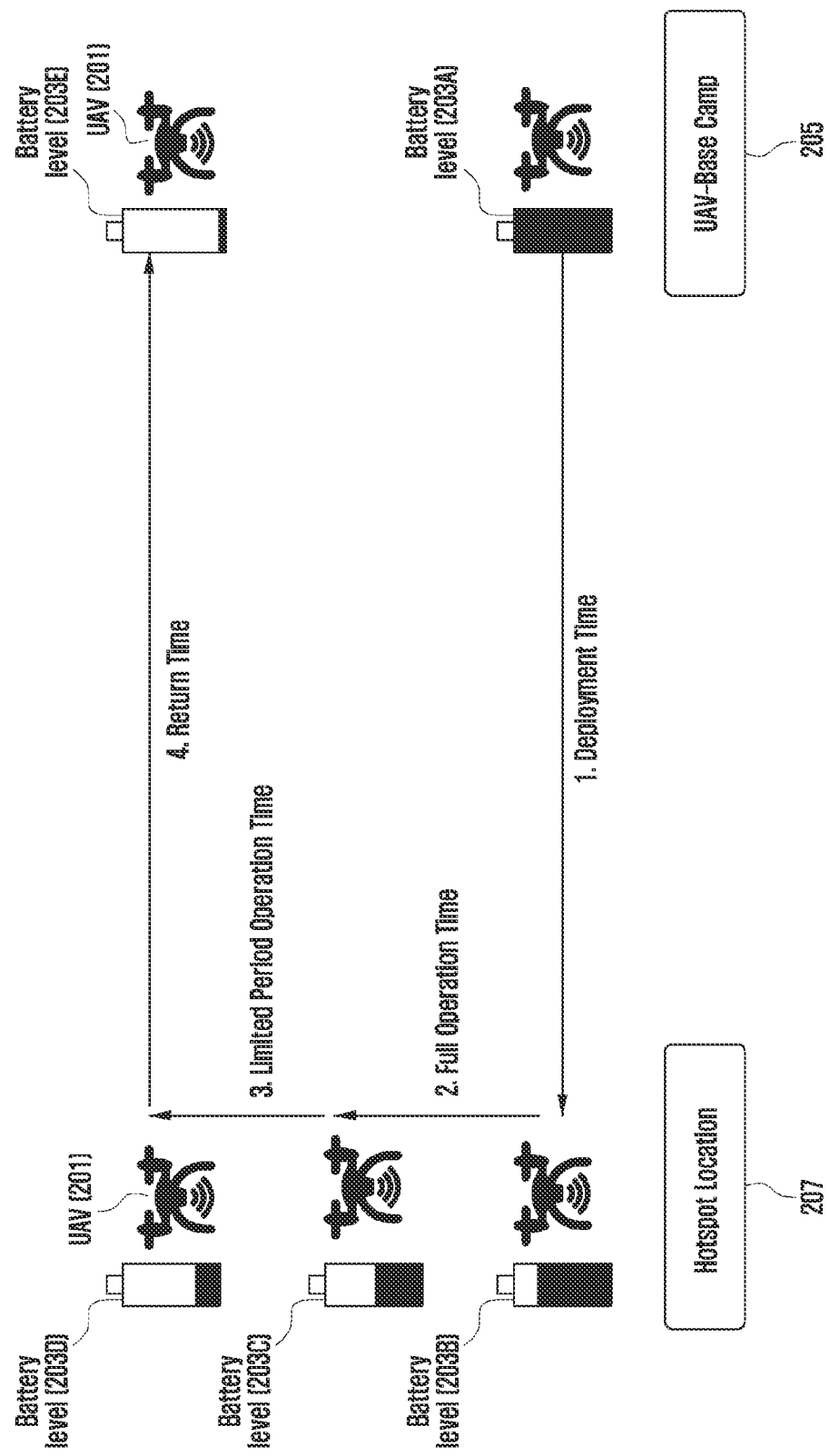

METHOD AND SYSTEM FOR MANAGING A CONTROL OPERATION OF AN UNMANNED AERIAL VEHICLE

CROSS-REFERENCE TO RELATED APPLICATION(S)

This application is a continuation of International Application No. PCT/KR2022/008052 designating the United States, filed on Jun. 8, 2022, in the Korean Intellectual Property Receiving Office and claiming priority to Indian Provisional Patent Application No. 202141025681 filed on Jun. 9, 2021, in the Indian Patent Office, and to Indian Non-Provisional Patent Application No. 202141025681 filed on May 24, 2022, in the Indian Patent Office, the disclosures of all of which are incorporated by reference herein in their entireties.

BACKGROUND

Field

The disclosure relates to wireless communication systems and, for example, to a method and system for managing a control operation for change of an Unmanned Aerial

Description of Related Art

In recent years, several broadband wireless technologies have been developed to meet the growing number of broadband subscribers for providing better applications and services. Second generation wireless communication system has been developed to provide voice services while ensuring the mobility of users. The third generation wireless communication system supports not only the voice service but also data service. In recent years, fourth generation (4G) wireless communication system has been developed to provide high-speed data service. However, currently, the 4G wireless communication system suffers from a lack of resources to meet the growing demand for high-speed data services. This problem is solved by the deployment of fifth generation (5G) wireless communication system to meet the ever-growing demand for high-speed data services. Furthermore, the 5G wireless communication system provides ultra-reliability and supports low latency applications.

For the sixth generation (6G) or beyond 5G wireless communication systems, there are various technologies have been under consideration. For example, such technologies include Visible Light Communication (VLC), Terahertz band (THz) e.g., frequencies from 100 GHz to 3 THz, Infrared wave, Ultraviolet wave, etc. Among all these technologies, the THz band is envisioned as a potential technology for a diverse range of applications, which exist within the nano, micro as well as macro scales. The various features of the THz band are such as it may provide terabits per second (TBPS) data rates, reliable transmission, and minimal latency.

The frequencies from 100 GHz to 3 THz are promising bands for the next generation of wireless communication systems because of the wide range of the unused and unexplored spectrum. The THz band communication system also may have revolutionary applications in the realm of devices, circuits, software, signal processing, and systems. The ultra-high data rates facilitated by mmWave and THz wireless local area and cellular networks enable super-fast download speeds for computer communication, autonomous vehicles, robotic controls, information shower, high-definition holographic gaming, entertainment, video conferencing, and high-speed wireless data distribution in data centers. In addition to the extremely high data rates, the THz band communication system also may have applications for future mmWave and THz systems that are likely to evolve in 6G networks, and beyond.

For the THz band communication system, the Terahertz band has specific characteristics like high path loss which includes the spreading as well as absorption loss. The terahertz band may be absorbed by raindrops, ice, grass, and any medium containing water molecule. The THz link is more sensitive than the mmWave system and therefore, it is more fragile. Thus, there are high chances that the THz link may be lost easily in such a sensitive system. Further, noise is an important characteristic of the THz band which may impact the interference model and signal-to-interference-plus-noise ratio (SINR) in the THz band. Due to the small wavelength at THz frequencies which is in the order of hundreds of micro-meters, THz waves scatter from almost any object in a real scenario, both indoor as well as outdoor causing scattering and reflection. Due to the characteristics of the THz band, a highly directional antenna that may generate very narrow beams in the case of the THz band is required.

The transmission and/or reception in a THz band system are based on narrow beams, which suppress the interference from neighbouring base stations and extend the range of a THz link. However, due to high path loss, heavy shadowing, and rain attenuation, reliable transmission at higher frequencies is one of the key issues that need to be overcome to make the THz band wave systems a practical reality.

Non-Terrestrial Networks (NTN) are expected to foster the roll out of 5G service in un-served areas that cannot be covered by terrestrial 5G networks (isolated/remote areas, on board aircrafts or vessels) and underserved areas (e.g., sub-urban/rural areas) to upgrade the performance of limited terrestrial networks in a cost effective manner. They will impact coverage, user bandwidth, system capacity, service reliability or service availability, energy consumption, and connection density. NTN includes spaceborne as well as airborne networks. The spaceborne network includes GEO, LEO, and MEO satellites while an access network based on Unmanned Aerial System (UAS) including High Altitude Platform Station (HAPS) could be considered as a special case of non-terrestrial access with lower delay/Doppler value and variation rate.

NTN network which is based on satellites and UAS or HAPS can only be used to improve the coverage of the system, but these cannot be used to improve the capacity of the system. Table 1 illustrates a different type of NTN platform as per 3GPP 38.811.

TABLE 1

| Platforms | Altitude range | Orbit | Typical beam footprint size |
|---|---|---|---|
| Low-Earth Orbit (LEO) satellite | 300-1500 km | Circular around the earth | 100-1000 km |
| Medium-Earth Orbit (MEO) satellite | 7000-25000 km | | 100-1000 km |
| Geostationary Earth Orbit (GEO) satellite | 35 786 km | notional station keeping position fixed in terms of elevation/azimuth with respect to a given earth point | 200-3500 km |
| UAS platform (including HAPS) | 8-50 km (20 km for HAPS) | | 5-200 km |

TABLE 1-continued

| Platforms | Altitude range | Orbit | Typical beam footprint size |
|---|---|---|---|
| High Elliptical Orbit (HEO) satellite | 400-50000 km | Elliptical around the earth | 200-3500 km |

Therefore, a mechanism is still needed to define control operation to handle the communication operation of UAV based Base stations operating in mmWave, high mmWave, Sub-THz, and THz bands with NTN network and 5G core network such that the problems high path loss, heavy shadowing, rain attenuation, and unreliable transmission at higher frequencies can be overcome. In particular, a new signalling mechanism is required to support the operation of aerial vehicles.

Further, as per 3GPP TR 22.829, in some scenarios such as e.g., disaster monitoring, border surveillance, and emergency assistance, unmanned aerial vehicles (UAVs) are a good choice for commercial application due to ease of deployment, low acquisition and maintenance costs, high-maneuverability and the ability to hover. From the wireless communication perspective, using the radio access node on-board UAV (e.g., UAV eNB/gNB/ng-eNB, UxNB) has already attracted interest from the community, especially using UxNB to enhance coverage in a variety of scenarios, e.g., emergency situations, temporary coverage for mobile users and hots-spot events, due to their fast deployment and large coverage capabilities.

Furthermore, as per 3GPP TR 38.811, the radio aspects of using Unmanned Aircraft Systems (UAS) include High Altitude Pseudo Satellites (HAPS) as a base station. In TR 38.811, it is described that the altitude of the so-called UAS can be between 8 km and 50 km. Due to its lower altitude (usually around 100 m), the UAV with an on-board base station (e.g., UxNB) is more flexible than the UAS, from the coverage and quick deployment perspective. The UxNB act as either base station or relay. An example diagram 100a depicting an illustration of UxNBs 103 (103A and 103B) acting as a base station is shown in FIG. 1A of the drawings, according to an existing technique. The UEs 101A and 101B are in communication with the 5G core network 105 via the UxNBs 103. In an embodiment, the UAV should be equipped with base station functionality to become the UxNB 103A or 103B. The DBS can fly to a designated area, by itself, or controlled by a human, and then hover over that area for a period of time as necessary. The UxNB can connect to the 5G core network 105 and work as a base station, via a wireless link, and bootstrap as a base station, from the core network perspective. The UxNB 103A or 103B should be authorized by the 5G system before it works. Further, an example diagram 100b depicting an illustration of the UxNB 103 acting as a relay is also shown in FIG. 1B of the drawings, according to an existing technique. Here, the UE 101 is in communication with the 5G core network 105 via the UxNB 103 which is acting as the relay for the communication between the UE 101 and the 5G core network 105.

UAV-mounted BSs/relays can be swiftly deployed and can support various application scenarios, such as temporary or unexpected events, emergency response, and search and rescue. Due to their high altitude above the ground, UAV-BSs/relays are more likely to have a line of sight (LoS) connection with their ground users compared to their terrestrial counterparts, thus providing more reliable links for communication. Usually, line-of-sight (LoS) links may occasionally be blocked by terrain, buildings, or the airframe itself. UAVs also have fully controllable mobility. UAV-BSs/relays possess an additional degree of freedom (DoF) for communication performance enhancement by dynamically adjusting their locations in 3-D to cater to the terrestrial and enhance the user centric throughput.

Further, the UAV when acting as the base station, relays or TRPs, or any other network entity has certain technical challenges like UAVs have limited flying time, typically in the range from 10 minutes to 1 hour. Due to the complex relationship between weight, battery power, payload, aerodynamics, controllability, regulations, and so on, the flying time cannot be increased arbitrarily or endlessly. The power consumption can also be high for UxNBs due to various constraints. Also, more power consumption may imply less limited flying time.

Therefore, in order to provide continuous communication service through UAVs, there lies a need to define control operation for handling the operation of multiple UAVs, and a new signalling mechanism is required to support the UAV. In particular, there is a need for a method and system that can manage the UAV operation control mechanism for replacement of the UAV and the addition or removal of the UAV to address at least one of the aforementioned aspects for a seamless user experience for the 6G cellular system.

SUMMARY

According to an example embodiment, the present disclosure describes a method for managing a control operation by an Unmanned Aerial Vehicle (UAV), the method includes: periodically receiving a request for transmission of UAV assistance information from a network entity and establishing a radio resource control (RRC) connection with the network entity using unicast communication; determining, in response to the received request, a triggering of at least one event corresponding to an initiation of a UAV control operation, and transmitting the UAV assistance information to the network entity based on the determined triggering of the at least one event. The UAV assistance information is transmitted to the network entity in an RRC connected state in response to the received request. Furthermore, the method includes receiving a control message from the network entity in response to the transmitted UAV assistance information. The control message includes information related to an execution of the UAV control operation. The method further includes executing the UAV control operation based on the information included in the received control message.

According to a example embodiment, the present disclosure describes a method for controlling the operation of an Unmanned Aerial Vehicle (UAV) by a network entity. The method includes: transmitting a UAV assistance request message to the UAV and establishing a radio resource control (RRC) connection with the network entity using one of a multicast communication, a broadcast communication, or a unicast communication; receiving the UAV assistance information from the UAV in an RRC connected state and transmitting a control message to the UAV based on the received UAV assistance information, wherein the transmitted control message includes information related to an execution of a UAV control operation or specific operational parameter changes.

According to an example embodiment, the present disclosure describes a system for managing a control operation that includes: a network entity and an Unmanned Aerial Vehicle (UAV) including at least one processor. The at least one processor is configured to: periodically receive a request for transmission of UAV assistance information from a network entity and establish a radio resource control (RRC) connection with the network entity using unicast communication; determine, in response to the received request, a triggering of at least one event corresponding to an initiation of a UAV control operation; and transmit, in an RRC connected state in response to the received request, the UAV assistance information to the network entity based on the determined triggering of the at least one event. The at least one processor is further configured to receive a control message from the network entity in response to the transmitted UAV assistance information. The control message includes information related to an execution of the UAV control operation. The at least one processor is further configured to execute the UAV control operation based on the information included in the received control message.

According to an example embodiment, the present disclosure describes a system for managing a control operation that includes: an Unmanned Aerial Vehicle (UAV) and a network entity including at least one processor. The at least one processor is configured to: transmit a UAV assistance request message to the UAV and establish a radio resource control (RRC) connection with the UAV using one of a multicast communication, a broadcast communication, or a unicast communication; receive the UAV assistance information from the UAV in an RRC connected state; and transmit a control message to the UAV based on the received UAV assistance information, wherein the transmitted control message includes information related to an execution of a UAV control operation or specific operational parameter changes.

To further clarify the advantages and features of the present disclosure, a more particular description will be provided with reference to specific embodiments thereof, which is illustrated in the appended drawings. It is appreciated that these drawings depict only example embodiments of the disclosure and are therefore not to be considered limiting its scope. The disclosure will be described and explained with additional specificity and detail with the accompanying drawings.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 2 is a diagram illustrating an example time analysis of a UAV operation, according to various embodiments;

Figure 1A:
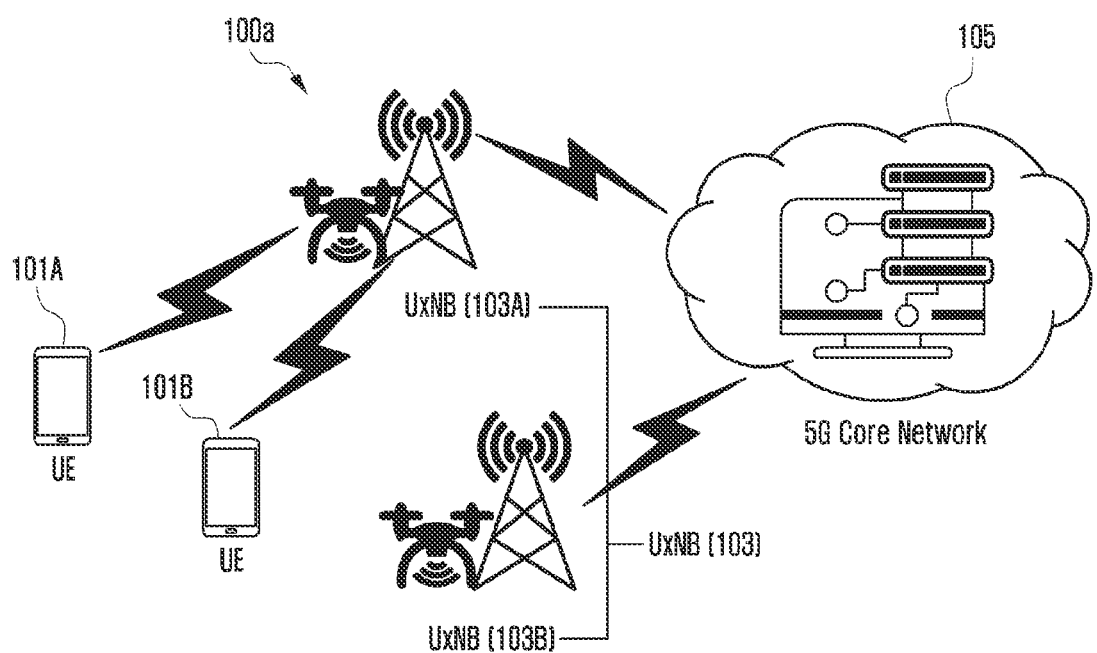
FIG. 1A is a diagram illustrating UxNBs acting as a base station, according to an existing technique.
Figure 1B:
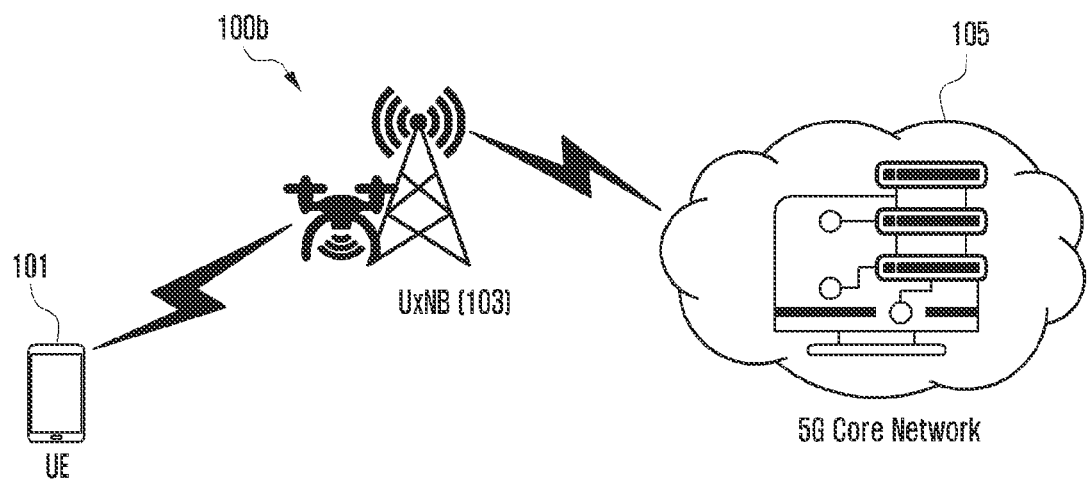
FIG. 1B is a diagram illustrating a UxNB acting as a relay, according to an existing technique.

Further, skilled artisans will appreciate that elements in the drawings are illustrated for simplicity and may not have been necessarily been drawn to scale. For example, the flowchart illustrate the method in terms to help to improve understanding of aspects of the present disclosure. Furthermore, in terms of the construction of the device, one or more components of the device may have been represented in the drawings by conventional symbols, and the drawings may show various details that are pertinent to understanding the various example embodiments of the present disclosure so as not to obscure the drawings with details that will be readily apparent to those of ordinary skill in the art.

DETAILED DESCRIPTION

It should be understood at the outset that although illustrative implementations of the various example embodiments of the present disclosure are illustrated below, the present disclosure may be implemented using any number of techniques, whether currently known or in existence. The present disclosure is not necessarily limited to the illustrative implementations, drawings, and techniques illustrated below, including the example design and implementation illustrated and described herein, but may be modified within the scope of the present disclosure.

It is to be understood that as used herein, terms such as, "includes," "comprises," "has," etc. are intended to refer, for example, to the one or more features or elements listed being within the element being defined, but the element is not necessarily limited to the listed features and elements, and that additional features and elements may be within the meaning of the element being defined.

Whether or not a certain feature or element was limited to being used only once, either way, it may still be referred to as "one or more features" or "one or more elements" or "at least one feature" or "at least one element." Furthermore, the use of the terms "one or more" or "at least one" feature or element do not preclude there being none of that feature or element unless otherwise specified by limiting language such as "there NEEDS to be one or more . . . " or "one or more element is REQUIRED."

Unless otherwise defined, all terms, and any technical and/or scientific terms, used herein may be taken to have the same meaning as commonly understood by one having ordinary skill in the art.

Some components are exaggerated, omitted, or schematically illustrated in the accompanying drawings. As such, the size of each component does not fully reflect the actual size.

In each figure, the same or corresponding elements may be assigned the same reference numerals.

Each block in the flowcharts may represent part of a module or segment. The functions described in the blocks may occur out of the order noted in the drawings. For example, two blocks illustrated in succession may be executed substantially concurrently, or the blocks may sometimes be executed in reverse order, depending on the functions involved therein.

For the convenience of description, the present disclosure includes terms and names defined in LTE and new radio (NR) standards defined by the 3GPP group. However, the present disclosure is not limited by the terms and names and may be equally applied to other systems conforming to other standards.

Embodiments of the present disclosure will be described in greater detail below with reference to the accompanying drawings.

FIG. 2 is a diagram illustrating an example time analysis of a UAV operation, according to various embodiments. In accordance with FIG. 2, a flying radio access network is typically required for the area where ground-based radio access network equipment cannot be installed. The UAV 201 has to fly some distance from the UAV-Base camp 205 to the hotspot location 207, and the UAV 201 has to fly back to UAV-Base camp 205 before it runs out of power. Further, the sum of time for each operation e.g., sum of deployment time (1), full operation time (2), limited period operation time (3), and return time (4) as shown in FIG. 2 should be smaller than a maximum flying time of the UAV 201. Then, the actual time that the flying radio access network can operate will be smaller than the sum of time. During each operation time the UAV 201 detects a depletion level of the battery, for example, battery level 203A, 203B, 203C, 203D and battery Level 203E as shown in FIG. 2. The mode illustrated in FIG. 2 is a mode where the UAV 201 detects a residual energy level of the battery based on the detected battery depletion level 203C and reports the detected residual energy level to a control NW entity 301 illustrated in FIG. 3 below. In this mode, the other parameters such as less power, less bandwidth, fewer resources, etc, may also be triggered and reported to the control NW entity 301.

Figure 3:
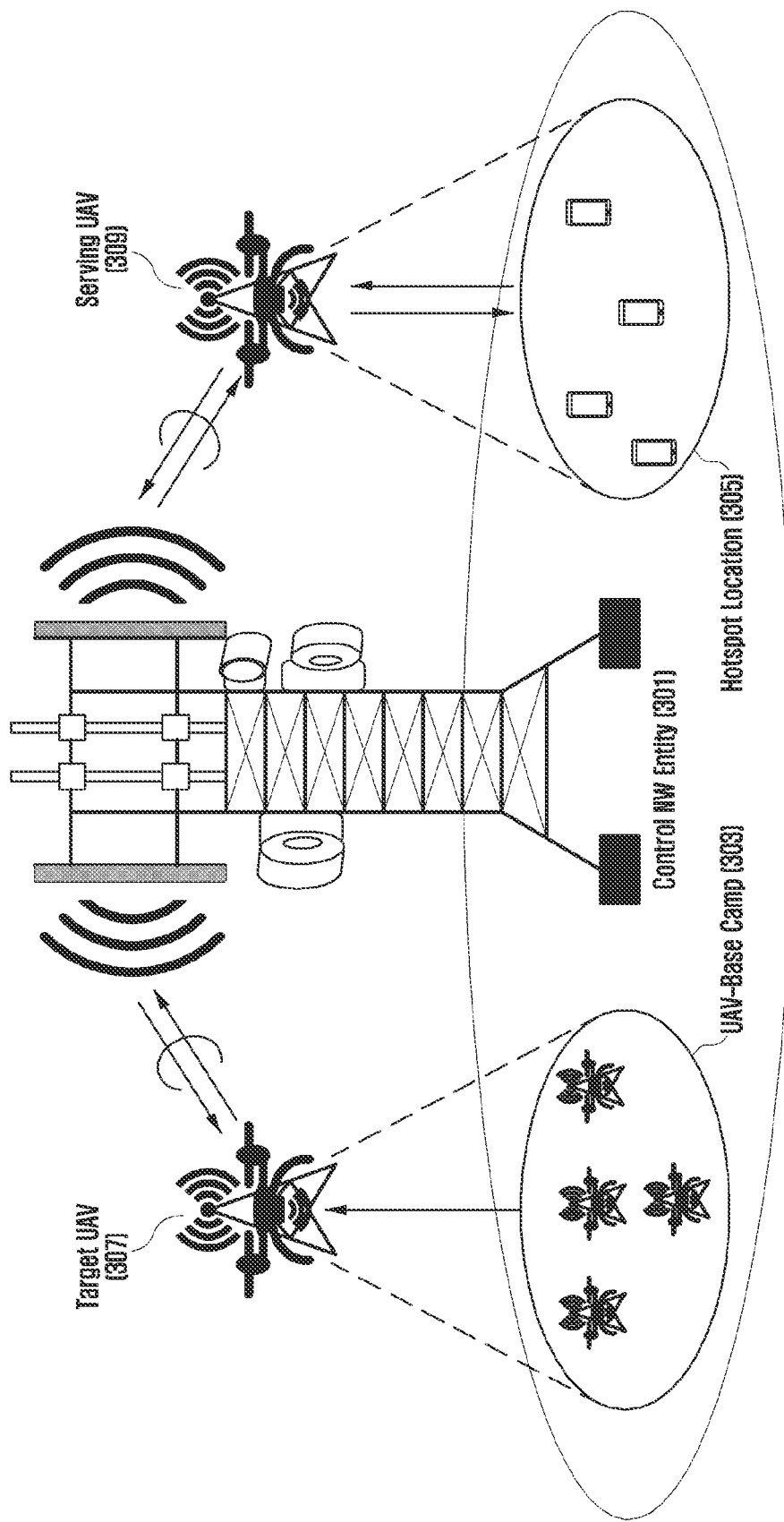
FIG. 3 is a diagram illustrating an example communication system including a target UAV, network entity, and a serving UAV managing a control operation of the UAVs, in accordance with various embodiments.

FIG. 3 is a diagram illustrating an example communication system including a target UAV, network entity, and a serving UAV for managing a control operation of the UAVs, according to various embodiments. The communication system includes a Control NW Entity 301, a target UAV 307 at a UAV-Base camp 303, and a serving UAV 309 serving a hotspot location 305. Each of the Control NW Entity 301, the target UAV 307, and the serving UAV 309 may include one or more processors for signalling a mechanism between UAVs (307, 309) and the control network entity 301. The signalling mechanism corresponds to a communication procedure between the components of the communication system using a communication interface. The communication system may include one or more user equipment (UEs) connected to the serving UAV 309 via a wireless interface (e.g., using a backhaul link). Further, the one or more processors may control and execute each of the operations required for the replacement of the serving UAV 309 with the target UAV 307.

According to an embodiment, the present disclosure provides a method and system for managing UAVs operation. For example, the Control NW Entity 301 corresponds to a network such as HAPS, satellite, ground network, moving network, or Core Network (NW) and may be configured to manage the UAVs operation by performing any of the operations among addition, replacement, change, modifying and reallocation of the UAVs for enabling seamless user experience for 6G cellular system. The Control NW Entity 301 may include, but is not limited to, DU, CU, TRP, Core NW, cloud network, or UAV controller. Further, The Control NW Entity 301 may also be configured to manage the operation of a plurality of UAVs. These UAVs may be classified as static, semi-static, or moving. The static UAVs may include UAVs that can be deployed at a specific location and can serve the one or more UEs or any other device. Further, the static UAVs cannot change their location once they are deployed. The semi-static UAVs may include UAVs that can change their location based on data requirements, UE feedback, etc. The semi-static UAVs may serve the one or more UEs or other devices at a specific location and then based on feedback they can change their location. The moving UAVs are UAVs that can move continuously at a certain speed. The speed of the moving UAVs depends upon the type of application and deployments.

In an embodiment, the serving UAV 309 is configured to inform the Control NW Entity 301 which can trigger a procedure for change, replacement, addition, or removal of UAVs. The serving UAV 309 may be configured to transmit messages like UAV assistance information, a UAV status indication, any other existing RRC message, X2 message, or NW-based message to the Control NW Entity 301. The Control NW Entity 301 may also configure the serving UAV 309 with a UAV assistance request, an RRC reconfiguration, or, any other existing message where it can define some condition or events along with timers.

A description of the functionalities of the communication system for managing the UAV control operation will be described in greater detail below with reference to FIGS. 4,5, 7, and 8 and line diagrams of FIGS. 6 and 9.

Figure 4:
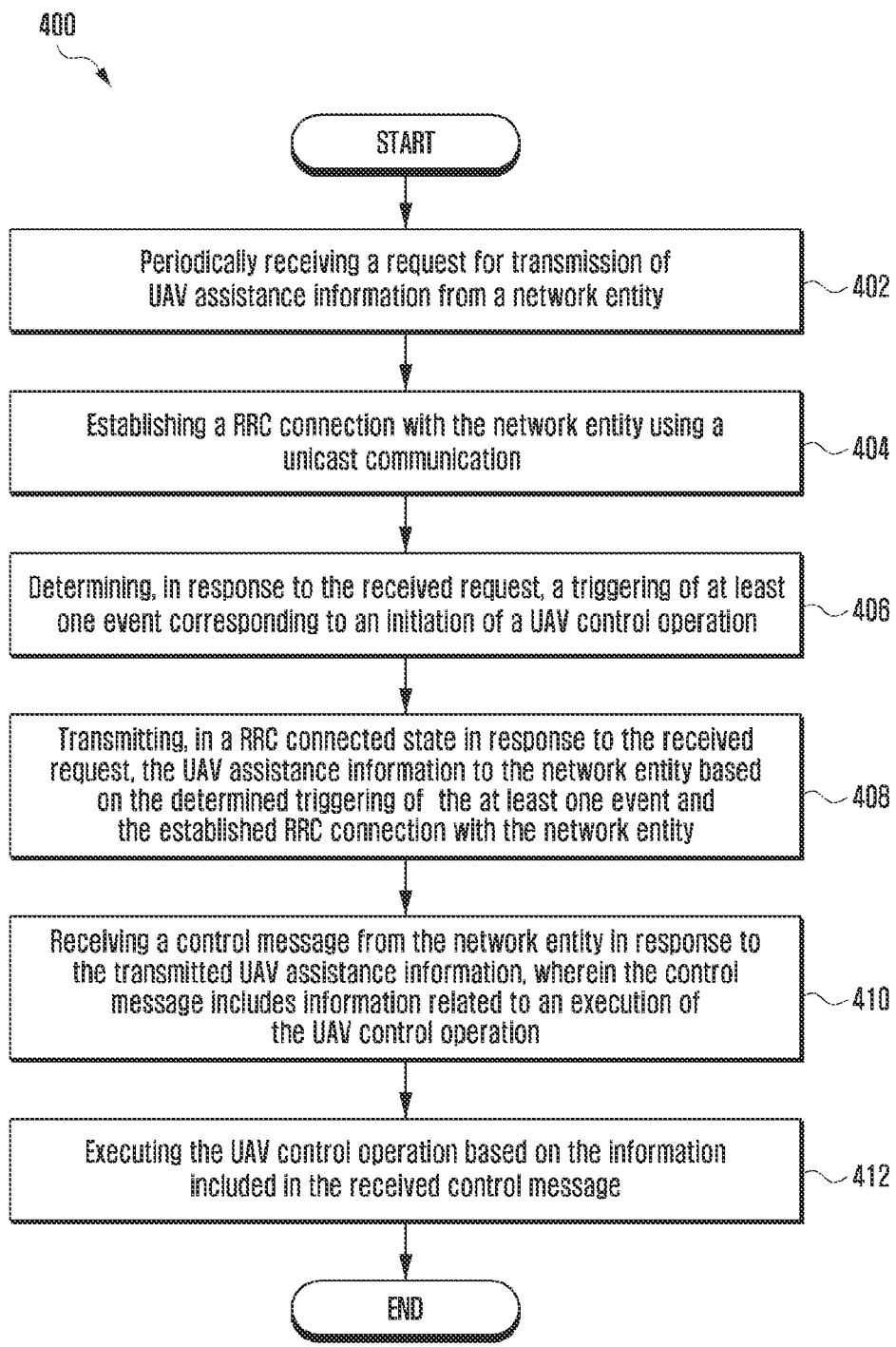
FIG. 4 is a flowchart illustrating an example method for managing a UAV control operation by the serving UAV 309 of FIG. 3, according to various embodiments.

FIG. 4 is a flowchart illustrating an example method for managing a UAV control operation by the serving UAV 309 of FIG. 3, according to various embodiments. For example, FIG. 4 illustrates a method 400 which illustrates an example signaling procedure between the serving UAV 309 and the Control NW Entity 301 for managing the UAV control operation.

The method 400 comprises periodically receiving (at operation 402) a request for transmission of UAV assistance information from the Control NW Entity 301. As an example, the Control NW Entity 301 is configured to manage operations of a cluster of UAVs, sub-cluster of UAVs, or dedicated UAVs using broadcast communication, multicast communication, or a dedicated link-based communication, respectively. The Control NW Entity 301 is configured to trigger periodic or aperiodic messages to the serving UAV 309 to request status or assisted information via one of the broadcast communication, multicast communication, or unicast communication. The Control NW Entity 301 may configure the serving UAV 309 with the UAV assistance request, the RRC reconfiguration, or any other existing message where it can define some condition or events along with the timers.

At operation 404, the method 400 further comprises establishing a radio resource control (RRC) connection with the Control NW Entity 301 using unicast communication. As an example, after the reception of the request for transmission of UAV assistance information as the message, the serving UAV 309 establishes an RRC connection with the Control NW Entity 301.

At operation 406, the method 400 further comprises determining, in response to the received request, a triggering of at least one event corresponding to an initiation of a UAV control operation. For example, the serving UAV 309 detects, as the at least one triggered event, at least one of a depletion status of a battery included in the UAV, a malfunction of the UAV, a variation in data rate, a requirement of a specific service-based UAV, and environmental factors related to an environment in which the UAV is positioned to serve one or more UEs. The serving UAV 309 detects the aforementioned triggering events using a trained Artificial Intelligence (AI) based learning model. After detection of the triggering of any of the events as described above, the serving UAV 309 may send status or assisted information to the Control NW Entity 301.

According to an embodiment of the present disclosure, various scenarios need to be managed in terms of control operation when the triggered event is detected by the serving UAV 309.

An example scenario may include that technical limitation such as weight and battery capacity, the maximum flying time of an airborne network is limited (e.g., 1 hour). Due to the complex relationship between weight, battery power, payload, aerodynamics, controllability, regulations, and so on, the flying time cannot be increased arbitrarily or endlessly. The effectiveness of the serving UAV 309 as a mobile radio access network platform may further be impacted by deployment scenarios. Thus, to provide continuous communication service through the serving UAVs, the serving UAVs are needed to be replaced by the target UAVs e.g., before the battery of the deployed hovering radio access network or the serving UAVs is exhausted.

Another example scenario is a case where the serving UAV 309 has malfunctioned, it needs to be replaced or removed. This requires fast service recovery after infrastructure failure.

Another example scenario is the varying data rate. The serving UAVs are not able to satisfy the data rates of the UEs and need to add more to the communication system or one with higher capability. The data traffic requirement of the UEs served by the serving UAVs may vary with time based on the number of UEs connected to the serving UAVs. By the time, if a current UAV is a resource depleted and a neighbouring UAV reaches a target zone, then the number of UEs or the data demand might have changed significantly. There might be situations whereby a single replacing UAV is unable to meet the data demand.

Another example scenario is a case of service specific UAVs. In this scenario, a few UAVs can be deployed for specific services for example but are not limited to, MBB, IoT kind of service, etc. These can be deployed on a basis of requirements.

Another example scenario is the limited operation mode. In the limited operation mode, the serving UAVs are configured to detect the residual energy level and report the detected residual energy level to the Control NW Entity 301. This can be triggered due to for example but is not limited to less power, less bandwidth, fewer resources, etc.

At operation 408, the method 400 further comprises transmitting, in an RRC connected state in response to the received request, the UAV assistance information to the Control NW Entity 301 based on the determined triggering of the at least one event and the established RRC connection with the Control NW Entity 301. For example, the serving UAV 309 is configured to transmit the UAV assistance information to the Control NW Entity 301 in the RRC_CONNECTED state and may initiate the transmission procedure upon detecting the trigger of predefined events or in a case when the serving UAV 309 moves out of a particular state. An example line diagram is illustrated in FIG. 6 illustrating an example process for a trigger message exchange between the serving UAV 309 and the Control NW Entity 301 of FIG. 3, according to various embodiments.

The UAV assistance information includes information related to information elements (IE) parameters. The IE parameters may include, but are not limited to, a respective MIMO feedback status, number of UEs that are connected to the serving UAV 309, field of view (FOV) of the UAV 309, transmission power of the serving UAV 309, average per-user data rate, a 3D space location of the serving UAV 309, beamforming parameters, adaptable MAC parameters, and each of a transmit bandwidth, operating frequency band, and aggregated carriers before disconnection of a service of the serving UAV 309, a height of the serving UAV 309, a battery status of the serving UAV 309, location parameters of the serving UAV 309, and a requirement of UAV services. The respective MIMO feedback status includes at least one of number of antenna elements, sub-arrays used, inter-antenna element spacing, or sub-array spacing in a case if they are adaptable. The beamforming parameters may include, but are not limited to, a beam-width, a number of beams, beam-width and spectral efficiency trade-off, directionality trade-off, beam-width and coverage trade-off, beam-directionality trade-off, and selection of optimal codebook for analog beam steering and digital beamforming. The adaptable MAC parameters may include, but are not limited to, a channel access probability and a fall-back trade-off in a case if the UAV network is operating on a dual operating frequency mode in one of a mid-band frequency range, an upper mid-band frequency range, high mmWave band, and sub-Terahertz band.

The information related to IE parameters may include, but is not limited to, information related to a number of UEs that are connected within a coverage area of the serving UAV 309, and information indicating a significant increase or change in the data traffic pattern of the serving UAV 309. The UAV assistance information may also include information associated with the average received signal-to-noise ratio (SNR) or signal-to-noise-plus-interference-ratio (SINR), information regarding the number of UEs on the ground connected to the serving UAV 309, performance outage information of the serving UAV 309, and coverage probability of the UAV 309.

According to an embodiment of the present disclosure, the information related to IE parameters may further include a sum-rate of the UAVs, per-user throughput corresponding to each of the UEs among the one or more UEs, an outage probability of the UAVs, a spectral efficiency density of the UAVs, an average latency of the UAVs, and an average packet error rate of the UAVs.

According to an embodiment of the present disclosure, the serving UAV 309 may receive, as the RRC message from one or more UEs, information related to a plurality of performance parameters including signal conditions and a throughput. After receiving these, the serving UAV 309 may periodically transmit, to the Control NW Entity 301, UAV assistance information after including each information related to the at least one triggered event and the received information related to the plurality of performance parameters into the UAV assistance information. There can also be trigger conditions that are based on an environmental factor, these trigger conditions for the serving UAV 309 may depend on rain, wind, wing damage, operating temperature, UAV heating issues, etc. The serving UAV 309 may also transmit the UAV assistance information to the Control NW Entity 301 in such trigger conditions which are based on the environmental factor.

According to an embodiment, the Control NW Entity 301 may also send a request message to the serving UAV 309 requesting the status periodically or on an aperiodic basis.

According to an embodiment of the present disclosure, upon initiation of the transmission procedure upon detecting the trigger of predefined events, the serving UAV 309 may also determine whether current UAV assistance information is different from the transmitted UAV assistance information by comparing the current UAV assistance information with the transmitted UAV assistance information. In addition, the serving UAV 309 may also perform a detection process to detect any event or to detect whether timer Txxx is running or not. If it is detected that the timer Txxx is not running, then the serving UAV 309 starts the timer Txxx with a timer value set to the indicationProhibitTimer and initiates transmission of the UAVAssistanceInformation message. Accordingly, the serving UAV 309 may control the triggering of the at least one event based on the determination that the current UAV assistance information is different from the transmitted UAV assistance information and a time value of the timer Txxx for initiation of the transmission of the current UAV assistance information.

At operation 410, the method 400 further comprises receiving a control message from the Control NW Entity 301 in response to the transmitted UAV assistance information. The control message includes information related to an execution of the UAV control operation. For example, the serving UAV 309 receives the control message including information related to the execution of the UAV control operation from the Control NW Entity 301 in response to UAV assistance information transmitted by the serving UAV 309 to the Control NW Entity 301. A detailed example of the control message will be explained later with reference to FIG. 5 of the drawings.

At operation 412, the method 400 comprises executing the UAV control operation using the information included in the control message received from the Control NW Entity 301. The execution of the UAV control operation corresponds to at least one of a replacement of the serving UAV 309, a modification of parameters corresponding to the serving UAV 309, and an addition of an additional UAV (e.g., the addition of a serving UAV in addition to the serving UAV 309, a reallocation of the serving UAV 309, and a modification in adaptable MAC parameters including one of a switching probability among frequency bands or back-off time values.

According to an embodiment of the present disclosure, the serving UAV 309 executes the UAV control operation using the information included in the control message and then transmits a request completion message to the Control NW Entity 301 indicating completion of the execution of the UAV control operation in response to the received control message. The request completion message includes, but is not limited to, updated parameter changes or information regarding an action taken by the serving UAV 309.

According to an embodiment of the present disclosure, the UAV control operation may include removal of the one or more serving UAVs or a set of serving UAVs from the network that is indicated in the control message by the Control NW Entity 301. In this scenario, the Control NW Entity 301 will also indicate a priority list of UAVs or terrestrial NW, where the UAV will re-direct all its UEs. After the redirection of all UEs, the identified UAV may send a completion response to the Control NW Entity 301 and shut down its operation, and then return to the UAV-Base Camp 302. The Control NW Entity 301 may share the identifier of the serving UAVs for which all UEs need to be moved. The Control NW Entity 301 may also trigger handovers for all the UEs to the target UAV.

According to an embodiment, the Control NW Entity 301 may configure certain triggers where the serving UAV 309 itself can take initiation actions like shut down of the UAV operation and return to the controller of its own. Before taking such initiation actions, the serving UAV 309 may ensure that all UEs and devices, that it is serving, are moved either to another UAV or a terrestrial network. The serving UAV 309 before shutting down its operation can either inform the Control NW Entity 301 with the message like UAV release or shutdown or any RRC message like UAV RRC connection release or some other indications to the Control NW Entity 301. On receiving any of these messages or indications, the Control NW Entity 301 may decide to replace the serving UAV 309 or add a new UAV to the network. Another possibility may also be possible that the serving UAV 309 may not choose to inform anything to the Control NW Entity 301 and may directly shut down its operation and fly back to UAV-base camp 303. There might be another possibility as well that the UAV-Base camp 303 may monitor the time when it has sent the serving UAV 309 to serve the UEs. On the expiry of the timer Txx, the UAV-Base camp 303 may send a request to the serving UAV 309 for the replacement. The Control NW Entity 301 may also send another UAV and may choose to send an indication to the serving UAV 309 after the expiry of the timer Txx+delta timer e.g., Tyyy, or may detect UAVs nearby the serving UAV 309. The Control NW Entity 301 may also share this information with the serving UAV 309 in advance which includes the details of neighbouring UAV. On the expiry of the timer, the serving UAV 309 may sync up with the new UAV and transfer all UEs served by the serving UAV 309 to a new UAV.

In a case of the addition of the new UAV, the Control NW Entity 301 may inform the serving UAV 309 about the addition of the new UAV and its specific location coordinates. Both the serving UAV 309 and newly deployed UAV may communicate with each other, and the serving UAV 309 may transfer some of the UEs under the new UAV. Moreover, some of the UEs may perform handovers to the new UAV. For these operations, an X2 link needs to be set up between these UAVs. Both the UAVs may be preconfigured with the same configuration, if there is any configuration change then the new UAV may inform the serving UAV 309.

Further, according to an embodiment of the present disclosure, when a set of UAVs covering an area is resource depleted and required to be replaced by a fresh set of UAVs, determining the optimal strategy for replacement becomes important. Therefore, the Control NW Entity 301 may include, for example, and without limitation, a plurality of options as mentioned below:

(a) All UAVs may pull out themselves from the network simultaneously or sequentially after a pre-scheduled time independent of the status of the replacing UAVs or their residual energy status.

(b) A fraction of UAVs may pull out themselves from the network simultaneously or sequentially after pre-scheduled time independent of the status of the replacing UAVs or their residual energy status.

(c) UAVs pull out themselves depending on the expected waiting duration for replacement and residual energy, or residual energy only, or expected waiting time only.

(d) UAVs may pull out themselves depending on PHY parameters such as but are not limited to an outage, BER, and drop-in application layer throughput.

The Control NW Entity 301 may also inform the serving UAV 309 that it needs to be replaced with the new UAV. The Control NW Entity 301 may inform about the replacement based on some timer, or after receiving the information about the replacement from the Control NW Entity 301, the serving UAV may immediately start the timer and on expiry of the timer, it may stop all the services. During this time period, the serving UAV 309 may ensure that all of the UEs being served by the serving UAV may perform handover with the new UAV so that there is no interruption in ongoing service.

Further, in a case of failure to receive any indication from the Control NW Entity 301 by the serving UAV 309 because of multiple reasons like UL failure between the Serving UAV 309 and the Control NW Entity 301 or DL failure between the Control NW Entity 301 and the serving UAV 309, each of the UAVs shall perform failure safety mechanism for moving to the nearest docking station having enough available resources to manage so. Furthermore, a critical threshold for the battery has to be self-maintained and monitored so that the UAV trajectory and path are secured to reach the nearest point safely. The docket station or UAV-Base camp 303 may also inform the parent base camp about the failure of the UAVs. This may be performed by assigning a unique UAV ID to each of the serving UAVs which can be a combination of the UAV and UAV-Base camp identifier.

According to an embodiment of the present disclosure, the Control NW entity 301 may request the serving UAV 309 to replace with another UAV having the same or different capability. In this scenario, the serving UAV 309 may transfer its whole L3, L2, and L1 context to the new UAV (different or same capability UAV) along with its capability. The new UAV may establish duplicate connections based on the available UEs context and informs the control NW entity 301. Then, the Control NW entity 301 sends the message to the serving UAV 309 to shut down its operation and return to UAV-Base camp 303. The new UAV may also be reconfigured based on its UAV capability.

Figure 5:
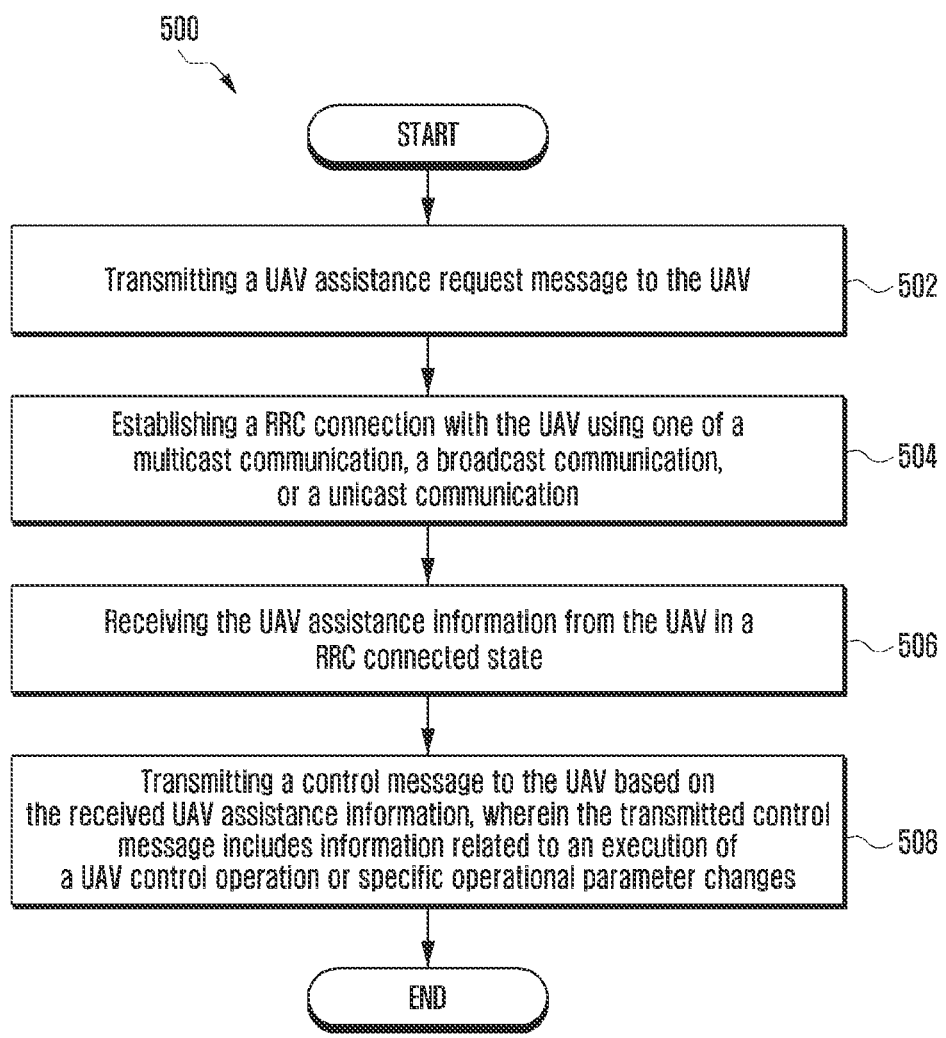
FIG. 5 is a flowchart illustrating an example method for managing the UAV control operation by the control NW entity 301 of FIG. 3, according to various embodiments.
Figure 6:
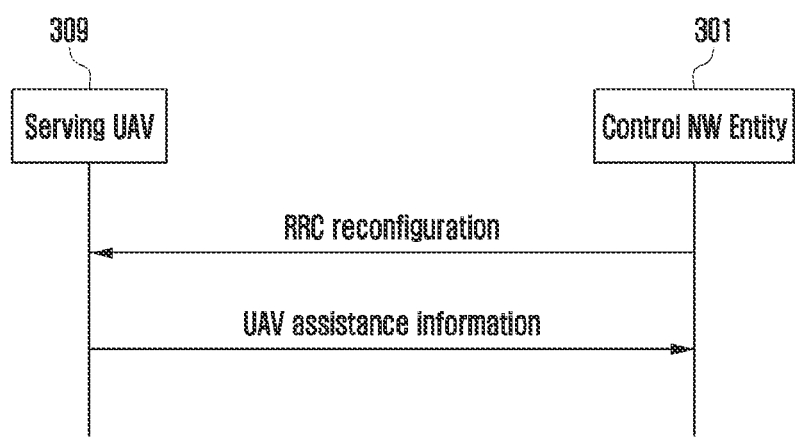
FIG. 6 is a signal flow diagram illustrating an example process for a trigger message exchange between the serving UAV 309 and the Control NW Entity 301 of FIG. 3, according to various embodiments.

FIG. 5 is a flowchart illustrating an example method for managing a UAV control operation by the Control NW Entity 301 of FIG. 3, according to various embodiments. For example, FIG. 5 illustrates a method 500 which illustrates a signaling procedure between the Control NW Entity 301 and the serving UAV 309 for managing the UAV control operation.

The method 500 comprises periodically transmitting (at operation 502) a UAV assistance request message to the serving UAV 309. For example, the Control NW Entity 301 transmits the UAV assistance request message to the serving UAV 309 including a request for the transmission of the UAV assistance information from the serving UAV 309.

Figure 7:
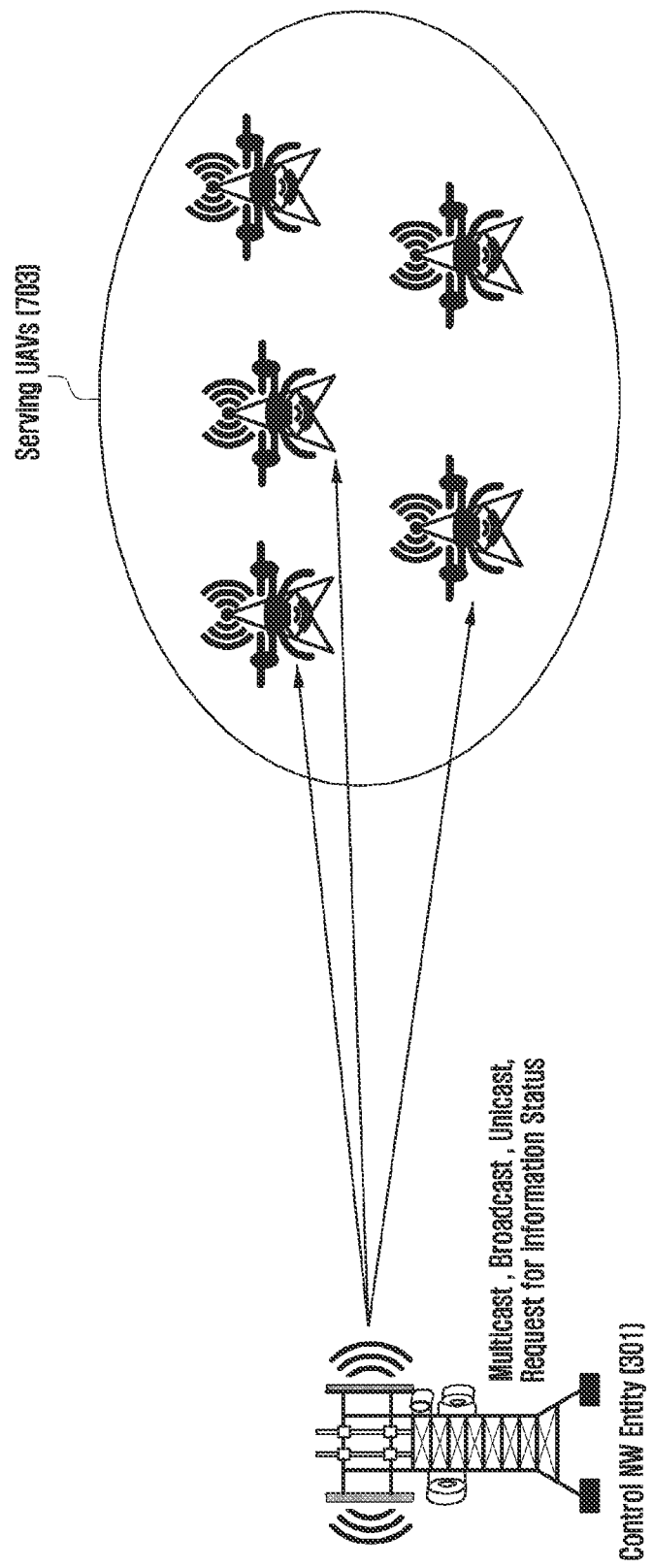
FIG. 7 is a diagram illustrating an example process for communication between the Control NW Entity and serving UAVs for requesting the assistance information by one of a broadcast communication, a multicast communication, and a unicast communication, according to various embodiments.

An example diagram depicting a process for communication between the Control NW Entity 301 and one or more of a cluster or a sub cluster of serving UAVs 703, a dedicated UAV, and other UAVs for requesting the assistance information by one of the broadcast communication, the multicast communication, and the unicast communication is shown in FIG. 7 of the drawings, in accordance with an embodiment of the present disclosure. In the broadcast communication, the Control NW Entity 301 may send the same message to all UAVs in the cluster for sharing status or assistance information. In Multicast communication, the Control NW Entity 301 may send the same message to a sub cluster, whereas the Control NW Entity 301 may send a different message to sub clusters in clusters of the serving UAVs 703. In the dedicated link-based communication, the Control NW Entity 301 may send the same or different message to each of the serving UAVs 703. The serving UAVs 703 can use the existing message or may send a new message like UAV assistance information, UAV UE request, or any other RRC message as described above. The serving UAV 309 can be referred to as a corresponding UAV among the serving UAVs 703 of FIG. 7. For the sake of simplicity, the serving UAV 309 is used to describe the signalling process between the Control NW Entity 301 and the serving UAVs 703.

At operation 504, the method 500 further comprises establishing the RRC connection with the serving UAV 309 using one of the multicast communication, the broadcast communication, or the unicast communication as described above with reference to FIG. 4.

At operation 506, the method 500 further comprises receiving the UAV assistance information from the serving UAV 309 in the RRC connected state.

At operation 508, the method 500 comprises transmitting the control message including information related to the execution of the UAV control operation or the specific operational parameter changes to the serving UAV 309 based on information related to the IE parameters included in the received UAV assistance information.

According to an embodiment of the present disclosure, the Control NW Entity 301 is configured to detect a type of issue or problem for the serving UAV 309 based on the UAV assistance information using a trained Artificial Intelligence (AI) based learning model and take possible actions for the serving UAV 309. The control message is sent to the serving UAV 309 from the Control NW Entity 301 after including the information regarding the possible actions that can be taken by the serving UAV 309.

An example of the generation of the control message and the determination of the possible action to be taken by the Control NW Entity 301 will be described with reference to FIG. 8 of the drawings. The Control NW Entity 301 indicates the possible action to be taken by the serving UAV 309 via the control message. The indication may include but is not limited to an addition, removal, or replacement of one or more UAVs among the serving UAVs. The Control NW Entity 301 on receiving the UAV assistance information from the serving UAVs, may take a certain action like change/add/replace/remove the one or more UAVs and transmits the same information to the serving UAVs in the form of the control message.

Figure 8:
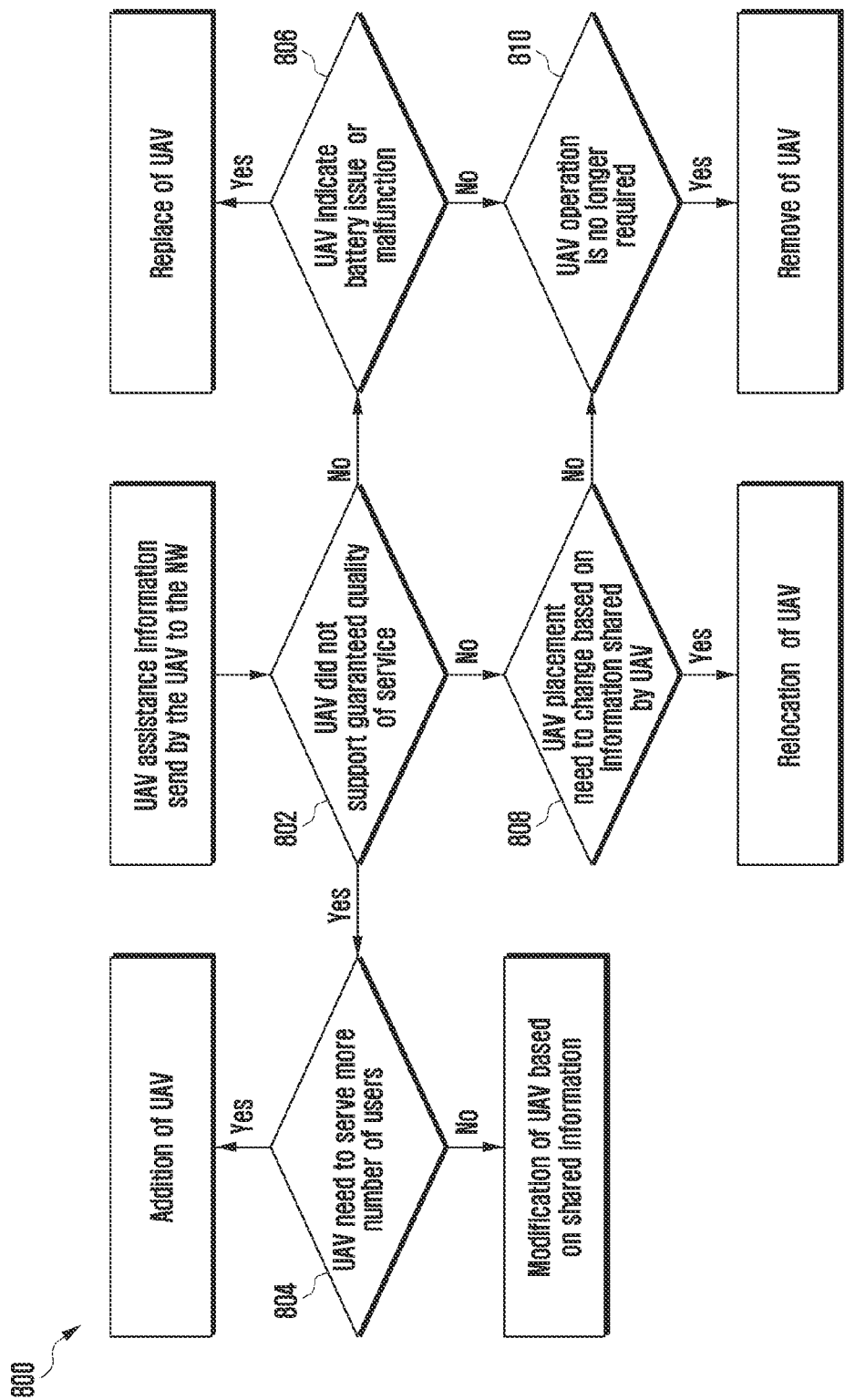
FIG. 8 is an operational flow diagram illustrating an example method for managing the control operation of a replacement, a reallocation, an addition, a modification, and removal of the one or more serving UAVs, according to various embodiments.

FIG. 8 is an operational flow diagram illustrating an example method 800 for managing the control operation of a replacement, a reallocation, an addition, a modification, and removal of the one or more serving UAVs, according to various embodiments.

The method 800 is performed by the Control NW Entity 301. At operation 802 of the method 800, the Control NW Entity 301 determines whether the serving UAV 309 is supporting a guaranteed Quality of Service (QoS) based on the information related to IE parameters in the received UAV assistance information. In an example, if a result of the determination at operation 802 is Yes, then at operation 804, the Control NW Entity 301 is further configured to determine whether the serving UAV 309 is required to serve a greater number of UEs in comparison to a number of UE's that is currently served by the serving UAV 309. The determination that the serving UAV 309 is unable to support the guaranteed QoS is determined based on a comparison of at least one of the sum-rate with a predefined sum-rate threshold, the per-user throughput with a throughput threshold, the outage probability with a signal-to-noise ratio (SNR) threshold, the spectral efficiency density with a predefined threshold associated with the spectral efficiency density, the average latency with a predefined threshold associated with the average latency, or the average packet error rate with a reliability threshold.

In an example, if a result of the determination at operation 804 is Yes, then the Control NW Entity 301 is further configured to generate the control message including information related to a requirement of an additional UAV for serving the greater number of UEs and accordingly transmits the generated control message to the serving UAV 309 indicating the addition of another UAV. Further, in particular, the Control NW Entity 301 decides, based on the UAV assistance information, that additional UAV or UAVs are required to serve the current set of UEs with requested quality of services in a cluster or sub cluster of UAVs.

According to an embodiment of the present disclosure, for the determination whether the serving UAV 309 is required to serve a greater number of UEs, at first the Control NW Entity 301 is configured to determine an increase in UE density within its network based on the information related to the number of UEs that are connected within the coverage area of the serving UAV 309 and determines that the serving UAV 309 is required to serve the greater number of UEs based on the determination of the increase in the UE density and the information indicating the significant increase or change in the data traffic pattern of the serving UAV 309.

According to an embodiment of the present disclosure, the Control NW Entity 301 is further configured to generate the control message including the information related to the requirement of the additional UAV based on at least one of an increase in the performance outage and one of a comparison of the average received SNR with an SNR threshold for a coverage area of the UAV, or a comparison of the number of UEs on the ground with a maximum number of UEs for which the UAV meets a minimum sum-rate threshold.

Further, in an example, if the result of the determination at operation 804 is No, then the Control NW Entity 301 is configured to generate the control message including information related to a modification of the serving UAV 309 based on the UAV assistance information. As an example, the Control NW Entity 301 decides, based on the UAV assistance information, that the operation of serving UAV or UAVs should be modified to support guaranteed quality of services to active UEs in a cluster, or a sub cluster of the serving UAVs. The modification of the operation of the serving UAV 309 is based on a prediction of at least one of a change in antenna element and a panel orientation of the serving UAV 309, a change in 3-D location and transmission power of the serving UAV 309, or an appropriate selection of beam steering vectors during transmission and receiving operation.

Further, in an example, if the result of the determination at operation 802 is No, then method 800 proceeds to operations 806 and 808. At operation 806, the Control NW Entity 301 is configured to determine, based on the IE parameter that indicates the battery status of the UAV, whether the UAV has indicated one of battery related issue or a malfunction of the battery when it is determined that the UAV supports the guaranteed QoS. If the result of the determination at operation 806 is Yes, then the Control NW Entity 301 is further configured to generate the control message including information related to a replacement of the serving UAV 309 with another UAV. For example, based on the UAV assistance information received from one of the serving UAV 309, sub cluster of UAVs, or cluster of UAVs, the Control NW Entity 301 decides that the same or different capability UAVs could be replaced with the reported UAV or UAVs.

Further, if a result of the determination at operation 806 is No, then the Control NW Entity 301 determines whether the UAV operation is required or not at operation 810 of the method 800. If a result of the determination at operation 810 is Yes, then the Control NW Entity 301 is further configured to generate the control message including information related to the removal of the serving UAV 309. For example, based on the UAV assistance information received from the serving UAV 309 or any other serving UAVs in the cluster or the sub cluster, the Control NW entity 301 removes the serving UAVs with or without modifying the operation of other UAVs in the cluster or the sub cluster.

At operation 808, the Control NW Entity 301 is configured to determine whether there is a need to change the position of the serving UAV 309 based on the UAV assistance information related to the location coordinates of the serving UAV. In an example, if the result of the determination at operation 808 is Yes, then the Control NW Entity 301 is further configured to generate the control message including information related to a relocation of the serving UAV 309 at a position different from a current position of the serving UAV 309. For example, based on the UAV assistance information that is received by the Control NW Entity 301 from the serving UAV and other UAVs in the cluster or the sub cluster, the Control NW Entity 301 may generate a control message for the serving UAV indicating the re-allocation of the serving UAV 309 to the different location in three-dimension space. It implies, that there is a possibility to predict the best location for the serving UAV 309 in the 3D space from where it can serve active users with all the constraints for example, but is not limited to transmit power, location, physical resources, and the like. Furthermore, in a case, if the result of the determination at operation 808 is No, then the Control NW Entity 301 repeats the process performed at operation 810.

According to an embodiment of the present disclosure, the Control NW Entity 301 may further generate the control message that includes information regarding a fall-back probability on the use of the pre-trained AI-based learning model or a non-AI model. In a case, if the UAV assistance information indicates that the reliability of the serving UAV 309 on the pre-trained AI-based learning model is greater than a pre-defined threshold value, in such case the Control NW Entity 301 may further generate the control message including a control signaling message for continuing the use of the pre-trained AI-based learning model for the determination of the triggering of the at least one event with a higher probability and transmits the same to the serving UAV 309. Further, if the UAV assistance information indicates that the reliability of the serving UAV 309 on the pre-trained AI-based learning model is lesser than the pre-defined threshold value, in such case the Control NW Entity 301 may generate the control message including a control signaling message for continuing the use of the pre-trained AI-based learning model for determining the triggering of the at least one event with a lower probability.

For example, the reliability of the UAV 309 on the pre-trained AI-based learning model implies determination of reliable information exchange (IE) parameters by the UAV 309 based on one of including, but is not limited to, the pre-trained AI assisted learning model, federated learning model, deep neural networks (DNNs), deep-reinforcement learning model, and the like. These AI based IE parameters could be, but are not limited to, beam related information, parameters addressing issues like errors introduced due to hovering and wobbling effects of the UAV 309 etc. These IE parameters are transmitted by the UAV 309 to the Control NW Entity 301 over the established RRC unicast/multicast link. The Non-AI model refers to a determination of the IE parameters based on a non-AI approach that includes one of, but is not limited to, deterministic wireless communication strategies like (solving for closed form solution, stochastic geometry assisted approach to determine the sum-rate of the Control NW Entity 301, and the outage probability).

According to the above-described methods and the functionalities of the communication system for managing the UAV control operation, a seamless user experience for the 6G cellular system can be provided. The communication system of the present disclosure further addresses each of the aforementioned problem aspects of UEs discuss in the background section by performing the methods 400, 500, and 800 for managing the UAV control operation of the serving UAVs. The methods described in the present disclosure address the existing problems such as disconnection, link failure, malfunctioning, and the like of the UAV while serving the UEs by providing the mechanism for the UAV control operation for replacement, addition, and removal of the UAVs.

Figure 9:
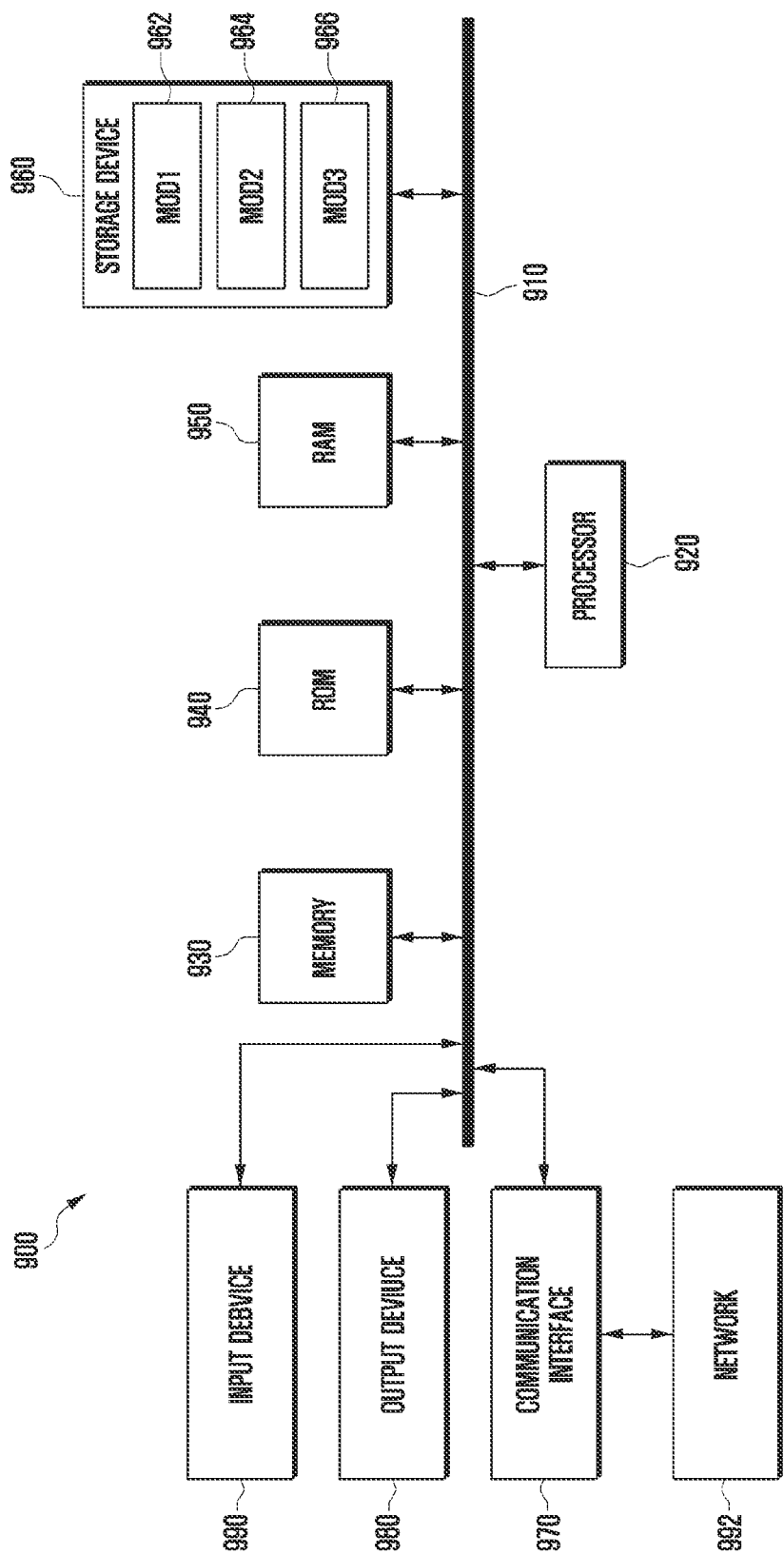
FIG. 9 is a block diagram illustrating an example configuration of the system in the form of a computer system, according to various embodiments.

Referring now to FIG. 9 is a block diagram illustrating an example configuration of the system in the form of a computer system 900, according to various embodiments.

The computer system 900 includes a processing unit (CPU or other processors) 920 and a system bus 910 that couples various system components including the system memory 930 such as read-only memory (ROM) 940 and random access memory (RAM) 950 to the processor 920. The system 900 also includes a cache of high-speed memory connected directly with, in close proximity to, or integrated as part of the processor 920. The system 900 copies data from the memory 930 and/or the storage device 990 to the cache for quick access by the processor 920. These and other modules can control or be configured to be controlled by the processor 920 to perform various actions. Other system memory 930 may be available for use as well. The memory 930 can include multiple different types of memory with different performance characteristics. It can be appreciated that the disclosure may operate on a computing device 900 with more than one processor 920 or on a group or cluster of computing devices networked together to provide greater processing capability. The processor 920 can include any general-purpose processor and a hardware module or software module, such as a first module (MOD1) 962, a second module (MOD2) 964, and a third module (MOD3) 966 stored in storage device 960. The processor 920 may essentially be a completely self-contained computing system, containing multiple cores or processors, a bus, memory controller, cache, etc. (such as a system-on-chip). A multi-core processor may be symmetric or asymmetric.

The system bus 910 may be any of several types of bus structures including a memory bus or memory controller, a peripheral bus, and a local bus using any of a variety of bus architectures. The computing system 900 further includes storage devices 960 such as a hard disk drive, a magnetic disk drive, an optical disk drive, a tape drive, a solid-state drive, or the like. The storage device 960 can include software modules 962, 964, and 966 for controlling the processor 920. Other hardware or software modules are contemplated. The storage device 960 may be connected to the system bus 910 by a drive interface. The drives and the associated computer-readable storage media provide non-volatile storage of computer-readable instructions, data structures, program modules, and other data for the computing system 900. In one aspect, a hardware module that performs a particular function includes the software component stored in a tangible computer-readable storage medium in connection with the necessary hardware components, such as the processor 920, bus 910, input device (e.g., including input circuitry) 990, and output device (e.g., including output circuitry) 980, and so forth, to carry out the function. The basic components and appropriate variations are contemplated depending on the type of systems, such as whether the computing system 900 is a small, aerial-based movable computing device, or a portable device capable of being hovered in the LAP platform.

The computer system 900 may also include a network 992 connected to the communication interface (e.g., including communication circuitry) 970. The network 992 may include wired networks, wireless networks, Ethernet AVB networks, or combinations thereof. The wireless network may be a cellular telephone network, an IEEE 802.11, 802.16, 802.20, 802.1Q or WiMax network. Further, the network 992 may be a public network, such as the Internet, a private network, such as an intranet, or combinations thereof, and may utilize a variety of networking protocols now available or later developed including, but not necessarily limited to including TCP/IP based networking protocols. The system is not necessarily limited to operation with any particular standards and protocols. For example, standards for Internet and other packet-switched network transmissions (e.g., TCP/IP, UDP/IP, HTML, and HTTP) may be used.

As would be apparent to a person in the art, various working modifications may be made to the method in order to implement the disclosed concept as taught herein.

The drawings and the forgoing description illustrate various example embodiments. Those skilled in the art will appreciate that one or more of the described elements may well be combined into a single functional element. Certain elements may be split into multiple functional elements. Elements from one embodiment may be added to another embodiment. For example, orders of processes described herein may be changed and are not necessarily limited to the manner described herein.

Moreover, the actions of any flow diagram need not be implemented in the order shown; nor do all of the acts necessarily need to be performed. Those acts that are not dependent on other acts may be performed in parallel with the other acts.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method for managing a control operation by an Unmanned Aerial Vehicle (UAV), comprising;
   periodically receiving a request for transmission of UAV assistance information from a network entity;
   establishing a radio resource control (RRC) connection with the network entity using a unicast communication;
   determining, in response to the received request, a triggering of at least one event corresponding to an initiation of a UAV control operation;

transmitting, in an RRC connected state in response to the received request, the UAV assistance information to the network entity based on the determined triggering of the at least one event;

receiving a control message from the network entity in response to the transmitted UAV assistance information, wherein the control message includes information related to an execution of the UAV control operation;

executing the UAV control operation based on the information included in the received control message;

wherein the triggering of the at least one event is determined by the UAV using a pre-trained Artificial Intelligence (AI) based learning model, and the control message further includes a fall-back probability on use of the pre-trained AI-based learning model; and wherein based on a reliability of the UAV on the pre-trained AI-based learning model being greater than a specified threshold value, the control message further includes a control signalling message for continuing the use of the pre-trained AI-based learning model for determining the triggering of the at least one event with a higher probability, and based on the reliability of the UAV on the pre-trained AI-based learning model being than the specified threshold value, the control message further includes the control signalling message for continuing the use of the pre-trained AI-based learning model for determining the triggering of the at least one event with a lower probability.

2. The method of claim 1, wherein the request for transmission of UAV assistance information is received as a message through one of a multicast communication, a broadcast communication, or the unicast communication.

3. The method of claim 1, wherein the at least one triggered event comprises at least one of a depletion status of a battery of the UAV, a malfunction of the UAV, a variation in data rate, a requirement of a specific service based UAV, and environmental factors related to an environment in which the UAV is positioned to serve one or more User Equipment (UE), the method further comprising:
  receiving as an RRC message, from the one or more UEs, information related to a plurality of performance parameters including signal conditions and a throughput; and
  periodically transmitting, to the network entity, UAV assistance information based on including each of information related to the at least one triggered event and the received information related to a plurality of performance parameters into the UAV assistance information.

4. The method of claim 3, wherein
the UAV assistance information includes information related to information elements (IE) parameters,
the IE parameters include at least one of a respective multiple input multiple output (MIMO) feedback status, number of UEs that are connected to the UAV, field of view (FOV) of the UAV, transmission power of the UAV, average per-user data rate, a 3D space location of the UAV, beamforming parameters, adaptable mandatory access control (MAC) parameters, and each of a transmit bandwidth, operating frequency band, and aggregated carriers before disconnection of the UAV service, a height of the UAV, a battery status of the UAV, location parameters, and a requirement of UAV services, and the respective MIMO feedback status includes at least one of number of antenna elements, sub-arrays used, inter-antenna element spacing, or sub-array spacing in a case if they are adaptable.

5. The method of claim 3, wherein
the beamforming parameters include at least one of beam-width, number of beams, beam-width and spectral efficiency trade-off, directionality trade-off, beam-width and coverage trade-off, and selection of optimal code-book for analog beam steering and digital beamforming, and
the adaptable MAC parameters include at least one of a channel access probability and a fall-back trade-off based on UAV network operating on a dual operating frequency mode in one of a mid-band frequency range, an upper mid-band frequency range, high mmWave band, and sub-Terahertz band.

6. The method of claim 1, wherein the execution of the UAV control operation corresponds to at least one of a replacement of the UAV, a modification of parameters corresponding to the UAV, an addition of an additional UAV, a reallocation of the UAV, and a modification in adaptable MAC parameters including one of a switching probability among frequency bands or back-off time values.

7. The method of claim 1, further comprising:
determining whether current UAV assistance information is different from the transmitted UAV assistance information based on a comparison of the current UAV assistance information with the transmitted UAV assistance information; and
controlling the triggering of the at least one event based on the determination that the current UAV assistance information is different from the transmitted UAV assistance information and a time value of a timer for initiation of the transmission of the current UAV assistance information.

8. An Unmanned Aerial Vehicle (UAV), comprising:
at least one processor,
wherein the at least one processor is configured to:
periodically receive a request for transmission of UAV assistance information from a network entity;
establish a radio resource control (RRC) connection with the network entity using a unicast communication;
determine, in response to the received request, a triggering of at least one event corresponding to an initiation of a UAV control operation;
transmit, in an RRC connected state in response to the received request, the UAV assistance information to the network entity based on the determined triggering of the at least one event; and
receive a control message from the network entity in response to the transmitted UAV assistance information, wherein the control message includes information related to an execution of the UAV control operation; and
execute the UAV control operation based on the information included in the received control message;
wherein the triggering of the at least one event is determined by the UAV using a pre-trained Artificial Intelligence (AI) based learning model, and the control message further includes a fall-back probability on use of the pre-trained AI-based learning model; and
wherein based on a reliability of the UAV on the pre-trained AI-based learning model being greater than a specified threshold value, the control message further includes a control signalling message for continuing the use of the pre-trained AI-based learning model for determining the triggering of the at least one event with a higher probability, and based on the reliability of the UAV on the pre-trained AI-based learning model being than the specified threshold value, the control message further includes the control signalling message for continuing the use of the pre-trained AI-based learning model for determining the triggering of the at least one event with a lower probability.

9. The Unmanned Aerial Vehicle (UAV) of claim 8, wherein the request for transmission of UAV assistance information is received as a message through one of a multicast communication, a broadcast communication, or the unicast communication.

10. The Unmanned Aerial Vehicle (UAV) of claim 8, wherein
the at least one triggered event comprises at least one of a depletion status of a battery of the UAV, a malfunction of the UAV, a variation in data rate, a requirement of a specific service based UAV, and environmental factors related to an environment in which the UAV is positioned to serve one or more User Equipment (UE),
wherein the at least one processor is further configured to:
receive as an RRC message, from the one or more UEs, information related to a plurality of performance parameters including signal conditions and a throughput; and
periodically transmit, to the network entity, UAV assistance information based on including each of information related to the at least one triggered event and the received information related to a plurality of performance parameters into the UAV assistance information.

11. The Unmanned Aerial Vehicle (UAV) of claim 10, wherein
the UAV assistance information includes information related to information elements (IE) parameters,
the IE parameters include at least one of a respective multiple input multiple output (MIMO) feedback status, number of UEs that are connected to the UAV, field of view (FOV) of the UAV, transmission power of the UAV, average per-user data rate, a 3D space location of the UAV, beamforming parameters, adaptable mandatory access control (MAC) parameters, and each of a transmit bandwidth, operating frequency band, and aggregated carriers before disconnection of the UAV service, a height of the UAV, a battery status of the UAV, location parameters, and a requirement of UAV services, and
the respective MIMO feedback status includes at least one of number of antenna elements, sub-arrays used, inter-antenna element spacing, or sub-array spacing in a case if they are adaptable.

12. The Unmanned Aerial Vehicle (UAV) of claim 10, wherein
the beamforming parameters include at least one of beam-width, number of beams, beam-width and spectral efficiency trade-off, directionality trade-off, beam-width and coverage trade-off, and selection of optimal code-book for analog beam steering and digital beamforming, and
the adaptable MAC parameters include at least one of a channel access probability and a fall-back trade-off based on UAV network operating on a dual operating frequency mode in one of a mid-band frequency range, an upper mid-band frequency range, high mmWave band, and sub-Terahertz band.

13. The Unmanned Aerial Vehicle (UAV) of claim 7, wherein the execution of the UAV control operation corresponds to at least one of a replacement of the UAV, a modification of parameters corresponding to the UAV, an addition of an additional UAV, a reallocation of the UAV, and a modification in adaptable MAC parameters including one of a switching probability among frequency bands or back-off time values.

14. The Unmanned Aerial Vehicle (UAV) of claim 8, wherein the at least one processor is further configured to:
determine whether current UAV assistance information is different from the transmitted UAV assistance information based on a comparison of the current UAV assistance information with the transmitted UAV assistance information; and
control the triggering of the at least one event based on the determination that the current UAV assistance information is different from the transmitted UAV assistance information and a time value of a timer for initiation of the transmission of the current UAV assistance information.

* * * * *